United States Patent
Forrest

(10) Patent No.: US 12,092,203 B1
(45) Date of Patent: Sep. 17, 2024

(54) PLANETARY GEAR ASSEMBLY WITH REVERSIBLE PTO SHAFT

(71) Applicant: Auburn Gear, LLC, Auburn, IN (US)

(72) Inventor: James L. Forrest, Arcola, IN (US)

(73) Assignee: Auburn Gear, LLC, Auburn, IN (US)

( * ) Notice: Subject to any disclaimer, the term of this patent is extended or adjusted under 35 U.S.C. 154(b) by 0 days.

(21) Appl. No.: 18/402,913

(22) Filed: Jan. 3, 2024

(51) Int. Cl.
| | |
|---|---|
| *B60K 17/28* | (2006.01) |
| *F16H 3/66* | (2006.01) |
| *F16H 57/023* | (2012.01) |
| *F16H 57/08* | (2006.01) |

(52) U.S. Cl.
CPC ........... *F16H 57/082* (2013.01); *B60K 17/28* (2013.01); *F16H 3/666* (2013.01); *F16H 57/023* (2013.01); *F16H 2200/0004* (2013.01); *F16H 2200/0005* (2013.01)

(58) Field of Classification Search
CPC ...... F16H 57/082; F16H 3/666; F16H 57/023; F16H 2200/2005; F16H 2200/0004; B60K 17/28; B60K 25/06
See application file for complete search history.

(56) References Cited

U.S. PATENT DOCUMENTS

| | | | |
|---|---|---|---|
| 2,975,643 A | 3/1961 | Ferguson | |
| 3,059,505 A * | 10/1962 | Reicks | F16H 1/28 |
| | | | 475/331 |
| 3,352,165 A | 11/1967 | Lee | |
| 3,464,277 A | 9/1969 | Longshore | |
| 3,513,712 A | 5/1970 | Zajichek et al. | |
| 3,715,704 A | 2/1973 | Boyle et al. | |
| 3,991,629 A | 11/1976 | Dearnley | |
| 4,685,340 A | 8/1987 | Shust et al. | |
| 5,667,330 A | 9/1997 | Henkel et al. | |
| 6,854,541 B2 | 2/2005 | Matufuji et al. | |
| 7,798,027 B2 | 9/2010 | Paul et al. | |
| 8,864,619 B2 | 10/2014 | Horsfall et al. | |
| 8,984,973 B1 | 3/2015 | Brenninger | |
| 9,260,010 B2 | 2/2016 | Neumann | |
| 9,579,976 B2 | 2/2017 | Horsfall et al. | |
| 10,336,187 B2 | 7/2019 | Horsfall et al. | |

FOREIGN PATENT DOCUMENTS

| | | | | |
|---|---|---|---|---|
| BY | 1546 U | * | 9/2004 | ............. B60K 17/28 |
| JP | 6862199 B2 | * | 4/2021 | ............. B60K 17/28 |

* cited by examiner

*Primary Examiner* — Tisha D Lewis
(74) *Attorney, Agent, or Firm* — Bose McKinney & Evans LLP

(57) ABSTRACT

A planetary gear assembly including an input sun gear; a first plurality of planetary gears driven by the input sun gear; a planet carrier coupled with the first plurality of planetary gears; and an output sun gear wherein rotation of the input sun gear drivingly rotates the planet carrier at a first rotational speed and the output sun gear at a different second rotational speed. An output shaft fixed to the planet carrier and the output sun gear are simultaneously rotated about a common longitudinal axis at the different speeds by rotation of the input sun gear. The output sun gear is accessible through a longitudinal passage in the output shaft. A PTO shaft is drivingly couplable with the output sun gear by inserting a first end of the PTO shaft into longitudinally extending passage or with the planet carrier by inserting the second end of the PTO shaft.

19 Claims, 9 Drawing Sheets

PLANETARY GEAR ASSEMBLY WITH REVERSIBLE PTO SHAFT

BACKGROUND

Power take-off (PTO) shafts are used to provide power to an auxiliary piece of equipment or implement and the use of such PTO shafts with agricultural tractors and other working machines is well-known in the art. The engine of the tractor or piece of equipment provides the power for driving the PTO shaft.

Such PTO shafts have been used for several decades and a variety of implements have been designed and manufactured which are adapted to be powered by such PTO shafts. Over time, U.S. manufacturers adopted two well-known standards for such implements. The original standard employs a PTO shaft having a six-tooth spline arrangement for engaging the implement and which is rotated at 540 rpm. A second standard was later developed and employs a PTO shaft having a 21-tooth spline arrangement for engaging the implement and which is rotated at 1,000 rpm. Other standards, e.g., having a rotational speed of 590 rpm, have also been developed and may be commonly employed in certain areas of the world.

SUMMARY

The present invention provides a planetary gear assembly with a reversible PTO shaft that can be used to drive the PTO shaft at two different rotational speeds.

One embodiment thereof may take the form of a planetary gear assembly including an input sun gear; at least one planetary gearset having a first plurality of planetary gears driven by the input sun gear; a planet carrier drivingly coupled with the first plurality of planetary gears; an output sun gear drivingly coupled with the planetary gear assembly wherein rotation of the input sun gear drivingly rotates the planet carrier at a first rotational speed and the output sun gear at a second rotational speed that differs from the first rotational speed; an output shaft rotationally fixed to the planet carrier wherein the output shaft and the output sun gear are simultaneously rotated about a common longitudinal axis at different speeds by rotation of the input sun gear, a longitudinally extending central passage extending through the output shaft wherein the output sun gear is accessible through the longitudinally extending central passage; and a PTO shaft having a first end and an opposite second end, the first end having a first set of splines defining a first spline arrangement and the second end having a second set of splines defining a second spline arrangement different than the first spline arrangement, wherein the PTO shaft is drivingly couplable with the planet carrier by inserting the second end of the PTO shaft into the longitudinally extending passage whereby the PTO shaft is rotatable at the first rotational speed with the first end of the PTO shaft projecting outwardly from the planetary gear assembly; and wherein the PTO shaft is drivingly couplable with the output sun gear by inserting the first end of the PTO shaft into longitudinally extending passage whereby the PTO shaft is rotatable at the second rotational speed with the second end of the PTO shaft projecting outwardly from the planetary gear assembly.

In some embodiments of the planetary gear assembly, the first spline arrangement is a 6 tooth arrangement and the second spline arrangement is a 21 tooth arrangement and, when the input sun gear is rotated at a preselected rotational speed, the planet carrier is rotated at a nominal rotational speed of 540 rpm and the output sun gear is rotated at a nominal rotational speed of 1000 rpm.

In some embodiments of the planetary gear assembly, the at least one planetary gearset further includes a second planetary gearset comprising a second plurality of planetary gears and the second plurality of planetary gears is drivingly coupled with the output sun gear.

In some embodiments of the planetary gear assembly having a second planetary gearset, each of the second plurality of planetary gears drivingly coupled with the input sun gear and a second set of gear teeth drivingly coupled with the output sun gear. In some embodiments, the first set of gear teeth define a first diameter and the second set of gear teeth define a second diameter, the first and second diameters being different whereby, during operation of the planetary gear assembly, the input sun gear and the output sun gear rotate at different rotational speeds.

In some embodiments having a second planetary gearset, each of the second plurality of planetary gears is coupled with the planet carrier. In such embodiments, each one of the second plurality of planetary gears is coupled with one of the first plurality of planetary gears by a pin extending through the planet carrier.

In some embodiments having a second planetary gearset, each of the second plurality of planetary gears is coupled with the planet carrier and each of the second plurality of planetary gears has a first set of gear teeth defining a first diameter and drivingly coupled with the input sun gear and a second set of gear teeth defining a second diameter and drivingly coupled with the output sun gear, the first and second diameters being different whereby, during operation of the planetary gear assembly, the input sun gear and the output sun gear rotate at different rotational speeds.

In some embodiments of the planetary gear assembly the output shaft has an internal set of splines disposed within the longitudinally extending passage; the PTO shaft has an intermediate set of splines defining a maximum diameter of the PTO shaft, the intermediate set of splines being positioned closer to the second end of the PTO shaft than the first end of the PTO shaft, the intermediate set of splines being engageable with the internal set of splines of the output shaft to thereby drivingly couple the PTO shaft with the planet carrier when the second end of the PTO shaft is inserted into the longitudinally extending passage; and the output sun gear has a splined recess engageable with the first set of splines of the PTO shaft to thereby drivingly couple the PTO shaft with the output sun gear when the first end of the PTO shaft is inserted into the longitudinally extending passage.

In such an embodiment as described in the preceding paragraph, the planetary gear assembly may also include a first bearing assembly disposed between the intermediate set of splines and the first end of the PTO shaft; and a second bearing assembly disposed on the PTO shaft between the intermediate splines and the second end of the PTO shaft and wherein the intermediate set of splines is closer to second bearing assembly than the first bearing assembly.

Such embodiments may further include a removable cover plate attachable to an outer end of the output shaft wherein, when the cover plate is attached and the second end of the PTO shaft is inserted into the longitudinally extending passage, the cover plate is engageable with the first bearing assembly and the second bearing assembly is engageable with a circumferentially extending surface within the longitudinally extending passage; and when the cover plate is attached and the first end of the PTO shaft is inserted into the longitudinally extending passage, the cover plate is engageable with the second bearing assembly and the first bearing assembly is engageable with the circumferentially extending surface within the longitudinally extending passage.

Such embodiments may further include a gearbox housing wherein the input sun gear and output shaft are at least partially disposed within the gearbox housing and the at least one planetary gearset, the planet carrier and the output sun gear are all disposed within the gearbox housing and wherein gearbox oil is contained within the gearbox housing; and a first oil seal is mounted on the cover plate and a second oil seal is mounted in the longitudinally extending passage wherein, when the cover plate is attached to the output shaft, the first oil seal and the second oil seal define an outer region in the longitudinally extending passage between the first oil seal and the second oil seal and inhibit the escape of gearbox oil from the gearbox housing into the outer region and the internal set of splines are disposed in the outer region. In such embodiments, the first bearing assembly and the second bearing assembly may be sealed ball bearing assemblies and, when the PTO shaft is drivingly engaged with the planetary gear assembly, the first bearing assembly and the second bearing assembly are both disposed in the outer region.

Another embodiment may take the form of a planetary gear assembly which includes an input sun gear; a first planetary gearset having a first plurality of planetary gears driven by the input sun gear; a planet carrier drivingly coupled with the first plurality of planetary gears; a second planetary gearset comprising a second plurality of planetary gears driven by the input sun gear; an output sun gear drivingly coupled with the second plurality of planetary gears wherein rotation of the input sun gear drivingly rotates the planet carrier at a first rotational speed and the output sun gear at a second rotational speed that differs from the first rotational speed; an output shaft rotationally fixed to the planet carrier wherein the output shaft and the output sun gear are simultaneously rotated about a common longitudinal axis at different speeds by rotation of the input sun gear, a longitudinally extending central passage extending through the output shaft wherein the output sun gear is accessible through the longitudinally extending central passage and wherein the output shaft has an internal set of splines disposed within the longitudinally extending passage; and a PTO shaft having a first end and an opposite second end, the first end having a first set of splines defining a first spline arrangement and the second end having a second set of splines defining a second spline arrangement different than the first spline arrangement, wherein the PTO shaft is drivingly couplable with the planet carrier by inserting the second end of the PTO shaft into the longitudinally extending passage whereby the PTO shaft is rotatable at the first rotational speed with the first end of the PTO shaft projecting outwardly from the planetary gear assembly; and wherein the PTO shaft is drivingly couplable with the output sun gear by inserting the first end of the PTO shaft into longitudinally extending passage whereby the PTO shaft is rotatable at the second rotational speed with the second end of the PTO shaft projecting outwardly from the planetary gear assembly; wherein the PTO shaft has an intermediate set of splines defining a maximum diameter of the PTO shaft, the intermediate set of splines being positioned closer to the second end of the PTO shaft than the first end of the PTO shaft, the intermediate set of splines being engageable with the internal set of splines of the output shaft to thereby drivingly couple the PTO shaft with the planet carrier when the second end of the PTO shaft is inserted into the longitudinally extending passage; and the output sun gear has a splined recess engageable with the first set of splines of the PTO shaft to thereby drivingly couple with the PTO shaft with the output sun gear when the first end of the PTO shaft is inserted into the longitudinally extending passage.

In such an embodiment, each of the second plurality of planetary gears may have a first set of gear teeth defining a first diameter and drivingly coupled with the input sun gear and a second set of gear teeth defining a second diameter and drivingly coupled with the output sun gear, the first and second diameters being different whereby, during operation of the planetary gear assembly, the input sun gear and the output sun gear rotate at different rotational speeds.

Additionally, each of the second plurality of planetary gears may be coupled with the planet carrier.

Further, each one of the second plurality of planetary gears may be coupled with one of the first plurality of planetary gears by a pin extending through the planet carrier.

In some embodiments wherein the second plurality of planetary gears are coupled with the planet carrier, the planetary gear assembly further includes a first bearing assembly disposed between the intermediate set of splines and the first end of the PTO shaft; a second bearing assembly disposed between the intermediate splines and the second end of the PTO shaft and wherein the intermediate set of splines is closer to second bearing assembly than the first bearing assembly; a removable cover plate attachable to an outer end of the output shaft wherein, when the cover plate is attached and the second end of the PTO shaft is inserted into the longitudinally extending passage, the cover plate is engageable with the first bearing assembly and the second bearing assembly is engageable with a circumferentially extending surface within the longitudinally extending passage; and when the cover plate is attached and the first end of the PTO shaft is inserted into the longitudinally extending passage, the cover plate is engageable with the second bearing assembly and the first bearing assembly is engageable with the circumferentially extending surface within the longitudinally extending passage. Additionally, the planetary gear assembly may also include a gearbox housing wherein the input sun gear and output shaft are at least partially disposed within the gearbox housing and the first and second planetary gearsets, the planet carrier and the output sun gear are all disposed within the gearbox housing and wherein gearbox oil is contained within the gearbox housing; a first oil seal is mounted on the cover plate and a second oil seal is mounted in longitudinally extending passage wherein, when the cover plate is attached, the first oil seal and the second oil seal define an outer region in the longitudinally extending passage between the first oil seal and the second oil seal and inhibit the escape of gearbox oil from the gearbox housing into the outer region and the internal set of splines are disposed in the outer region; and wherein the first bearing assembly and the second bearing assembly are sealed ball bearing assemblies and, when the PTO shaft is drivingly engaged with the planetary gear assembly, the first bearing assembly and the second bearing assembly are both disposed in the outer region.

Further, the first spline arrangement may be a 6 tooth arrangement and the second spline arrangement may be a 21 tooth arrangement and, when the input sun gear is rotated at a preselected rotational speed, the planet carrier is rotated at a nominal rotational speed of 540 rpm and the output sun gear is rotated at a nominal rotational speed of 1000 rpm.

BRIEF DESCRIPTION OF THE DRAWINGS

The above mentioned and other features of this invention, and the manner of attaining them, will become more apparent and the invention itself will be better understood by reference to the following description of an embodiment of the invention taken in conjunction with the accompanying drawings, wherein.

Figure 1:
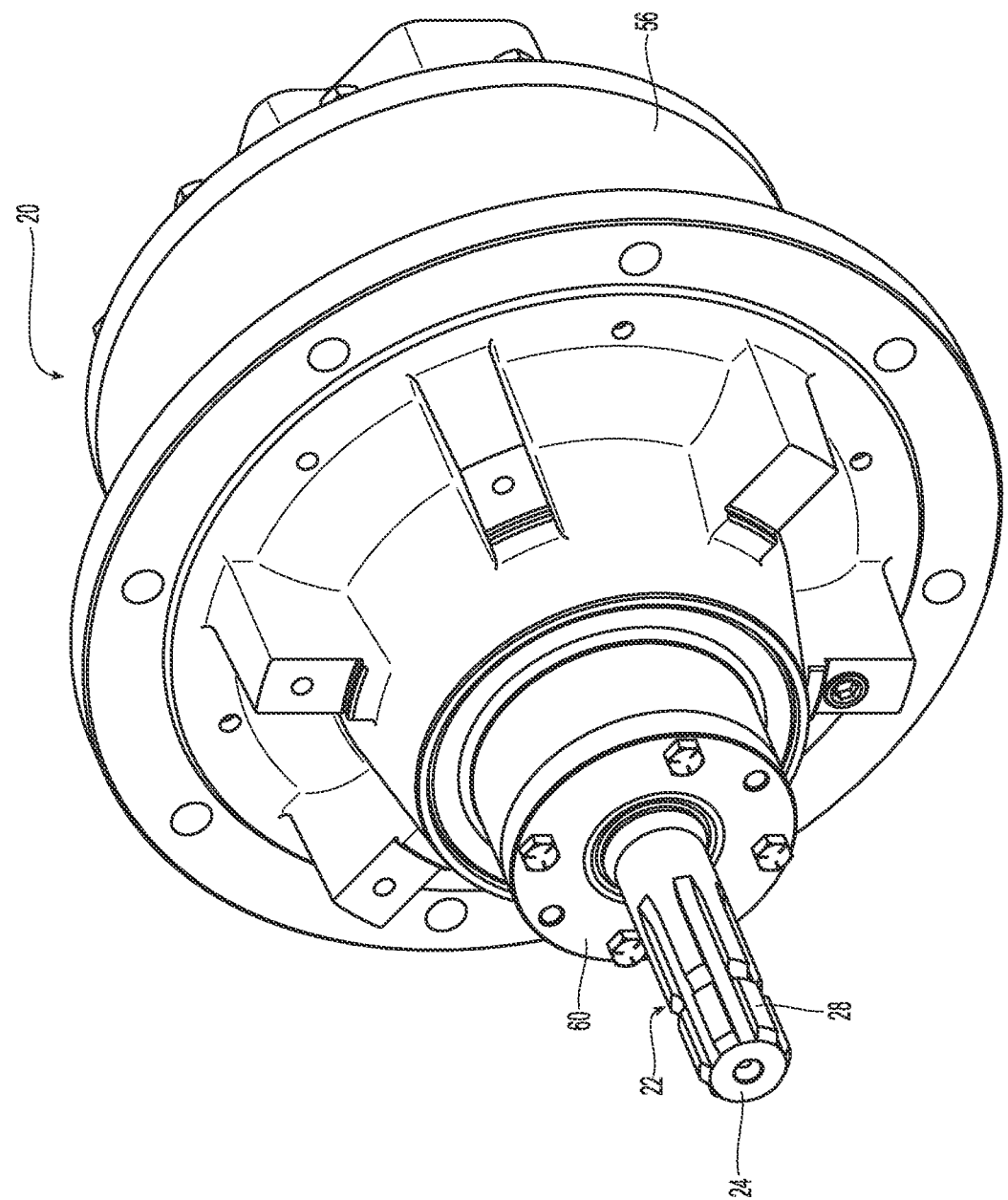
FIG. 1 is a perspective view of an exemplary planetary gear assembly with a first end of the PTO shaft extending outwardly.

Corresponding reference characters indicate corresponding parts throughout the several views. Although the exemplification set out herein illustrates an embodiment of the invention, in one form, the embodiment disclosed below is not intended to be exhaustive or to be construed as limiting the scope of the invention to the precise form disclosed.

DETAILED DESCRIPTION OF THE INVENTION

An exemplary embodiment of a planetary gear assembly 20 having a reversible PTO shaft 22 is shown in the figures. PTO shaft 22 has a first end 24 and an opposite second end 26 wherein both ends have spline arrangements. In the illustrated embodiment, first end 24 has a first set of splines 28 in the form of a 6 tooth arrangement and second end 26 has a second set of splines 30 in the form of a 21 tooth arrangement. While the 6 tooth and 21 tooth arrangements are standard spline arrangements used with a wide variety of implements, alternative spline arrangements and couplings may also be used with a planetary gear assembly as described herein.

The drive train of the exemplary gear assembly includes an input sun gear 32, a first planetary gearset 34, a planet carrier 36, a second planetary gearset 38, an output sun gear 40, an output shaft 42 and PTO shaft 22. The input sun gear 32, planet carrier 36, output sun gear 40, output shaft 42 and PTO shaft 22 all rotate about a common longitudinal axis 44.

First planetary gearset 34 is formed by a first plurality of planetary gears 35. In the illustrated embodiment, the first planetary gearset 34 has three planetary gears 35. Planetary gears 35 have an outer circumference with a set of gear teeth 35A that mesh with a set of gear teeth 32A on the outer circumference of input sun gear 32 whereby planetary gears 35 are drivingly coupled with input sun gear 32. A ring gear 46 extends circumferentially about the first plurality of planetary gears 35 and gear teeth 35A of planetary gears 35 are also engaged with the gear teeth 46A disposed on the radially inward facing surface of ring gear 46.

Power is input into planetary gear assembly 20 via input sun gear 32. Sun gear 32 has a splined bore 33 which receives a shaft in a rotationally fixed manner for imparting rotational power to input sun gear 32. The shaft used to rotate input sun gear may be powered, in turn, by an internal combustion engine, electrical motor, hydraulic motor or other suitable device for generating rotational power.

Each of the first plurality of planetary gears 35 is mounted to planet carrier 36 with a pin 37. As input sun gear 32 is rotated, input sun gear 32 drivingly rotates each individual planetary gear 35 about an axis defined by the pin 37 on which that individual planetary gear 35 is mounted. The interaction of planetary gears 35 with input sun gear 32 and ring gear 46 also causes planet carrier 36 along with planetary gears 35 to orbit or rotate about input sun gear 32 when input sun gear 32 imparts rotational power to planetary gear assembly 20. This motion of a sun gear, planetary gears and planet carrier is well known to those having ordinary skill in the art.

An output shaft 42 is rotationally fixed to planet carrier 36 and rotates along with planet carrier 36. As further discussed below, output shaft 42 is engageable with PTO shaft 22 to impart rotational power to PTO shaft 22.

Second planetary gearset 38 is formed by a second plurality of planetary gears 39. In the illustrated embodiment, the second planetary gearset 38 has three planetary gears 39. Planetary gears 39 each have a first set of gear teeth 39A defining a first diameter 48 that mesh with a set of gear teeth 32B on the outer circumference of input sun gear 32 whereby each of the planetary gears 39 are drivingly coupled with input sun gear 32.

Each of the second plurality of planetary gears 39 is mounted to planet carrier 36 on one of the pins 37. As input sun gear 32 is rotated, input sun gear 32 drivingly rotates each individual planetary gear 39 about an axis defined by the pin 37 on which that individual planetary gear 39 is mounted. The second plurality of planetary gears 39 do not engage a ring gear but, because planetary gears 39 are mounted on planet carrier 36, planetary gears 39 rotate or orbit about input sun gear 32 along with planet carrier 36 when the input sun gear 32 drives the rotation of planet carrier 36 via the first plurality of planetary gears 35.

Each of the planetary gears 39 also have a second set of gear teeth 39B defining a second diameter 49 that mesh with a set of gear teeth 40A on the outer circumference of output sun gear 40 whereby each of the planetary gears 39 are drivingly coupled with output sun gear 40. In the illustrated embodiment, the first and second diameters 48, 49 are different whereby the rotational speed of input sun gear 32 and output sun gear 40 are also different. In this illustrated embodiment, first diameter 48 is larger than second diameter 49 and the rotational speed of output sun gear 40 is less than the rotational speed of input sun gear 32.

Output sun gear 40 includes a splined recess 50 that mates with first end 24 of PTO shaft 22 whereby output sun gear 40 can drivingly rotate PTO shaft 22 about axis 44 when first end 24 is inserted into the recess also referred to herein as splined bore 50. A longitudinally extending central passage 43 centered on axis 44 extends through output shaft 42 and into splined bore 50. Passage 43 extends the full length of output shaft 42 and splined bore 50 of output sun gear 40 forms an extension of longitudinally extending central passage 43. In the illustrated embodiment, longitudinal axis 44 forms a common rotational axis of bore 50 and output sun gear 40 as well as input sun gear 32, planet carrier 36 and output shaft 42 as well as a common longitudinal axis of these components.

When input sun gear 32 is rotated this causes the simultaneous driving rotation of both planet carrier 36 and attached output shaft 42 and output sun gear 40. The rotational speed of planet carrier 36 and attached output shaft 42 differs from the rotational speed of output sun gear 40 at any one rotational speed of input sun gear 32. In other words, when input sun gear 32 is rotated, planet carrier 36 and output sun gear 40 will be simultaneously rotated at two different rotational speeds. While it would be possible to arrange the gearing assembly such that planet carrier 36 and output sun gear 40 have the same rotational speed this will generally not be desirable. Instead, it will generally be desirable have planet carrier 36 and output shaft 42 rotate at one speed while the output sun gear 40 rotates at a different speed to allow PTO shaft 22 to be selectively engaged with either the planet carrier 36/output shaft 42 or the output sun gear 40 to thereby have the ability to rotate PTO shaft 22 at either one of the two different speeds.

In the illustrated embodiment, to drivingly couple PTO shaft 22 with planet carrier 36, second end 26 of PTO shaft 22 is inserted into longitudinally extending central passage 43. PTO shaft 22 is drivingly coupled with planet carrier 36 by engagement with output shaft 42 which is secured to planet carrier 36. In this configuration, shown in FIGS. 1 and 3, PTO shaft 22 will rotate at the same rotational speed as planet carrier 36 with first end 24 of PTO shaft 22 projecting outwardly from planetary gear assembly 20 whereby the 6 tooth spline arrangement on first end 24 can be engaged with and provide power to an agricultural implement or other piece of equipment. By rotating planet carrier 36 at a nominal speed of 540 rpm, first end 24 can be engaged with a wide variety of implements designed to be powered by a six-splined PTO shaft rotated at 540 rpm.

In the exemplary embodiment, output shaft 42 has an internal set of splines 52 disposed within longitudinally extending passage 43 for engaging PTO shaft 22. PTO shaft 22 has a corresponding intermediate set of splines 54 to engage splines 52. Splines 54 define the maximum outer diameter 54D of PTO shaft 22 and are positioned closer to the second end 26 of PTO shaft 22 than to the first end 24 of PTO shaft 22. This non-midpoint positioning of splines 54 allow splines 54 to engage splines 52 of output shaft 42 when second end 26 of PTO shaft 22 is inserted in passage 43 but prevent splines 54 from engaging splines 52 when first end 24 of PTO shaft 22 is inserted in passage 43 and first end 24 engages output sun gear 40 and prevents further insertion of PTO shaft 22.

In the illustrated embodiment, when first end 24 of PTO shaft 22 is inserted into longitudinally extending central passage 43, the first end 24 can be used to engage output sun gear 40. PTO shaft 22 is drivingly coupled with output sun gear 40 by engagement of the 6 tooth spline arrangement on first end 24 of PTO shaft 22 with splined recess 50 of output sun gear 40. In this configuration, shown in FIGS. 2 and 6, PTO shaft 22 will rotate at the same rotational speed as output sun gear 40 with second end 26 of PTO shaft 22 projecting outwardly from planetary gear assembly 20 whereby the 21 tooth spline arrangement on second end 26 can be engaged with and provide power to an agricultural implement or other piece of equipment. By rotating output sun gear 40 at a nominal speed of 1000 rpm, second end 26 can be engaged with a wide variety of implements designed to be powered by a twenty-one-splined PTO shaft rotated at 1000 rpm.

In the exemplary body the gearing arrangements driving the rotation of planet carrier 36 and output sun gear 40 are configured so that for a selected input rotational speed of input sun gear 32, planet carrier 36 will be rotating at a nominal speed of 540 rpm and output sun gear 40 will be simultaneously rotating at a nominal speed of 1000 rpm. This allows for a single input speed to be used to provide these two standard speeds. In other words, when input sun gear 32 is rotated at a preselected rotational speed, planet carrier will be rotating at a nominal speed of 540 rpm and output sun gear 40 will be simultaneously rotating at a nominal speed of 1000 rpm.

For example, a hydraulic motor, an electrical motor or other power source which is operated at a single speed can be used to provide rotational power to planetary gear assembly 20 and allow PTO shaft 22 to be operated at one of two speeds depending on whether the PTO shaft is drivingly coupled to planet carrier 36 or output sun gear 40. This can be advantageous when the source of power for planetary gear assembly 20 can be operated at a speed where it is most efficient.

It is also noted that a nominal speed of 540 rpm or a nominal speed of 1000 rpm does not require the rotational speed to be precisely 540 rpm or 1000 rpm but simply within industry standards for generating such speeds and powering implements and other equipment designed for standard spline arrangements operated at such speeds.

Figure 3:
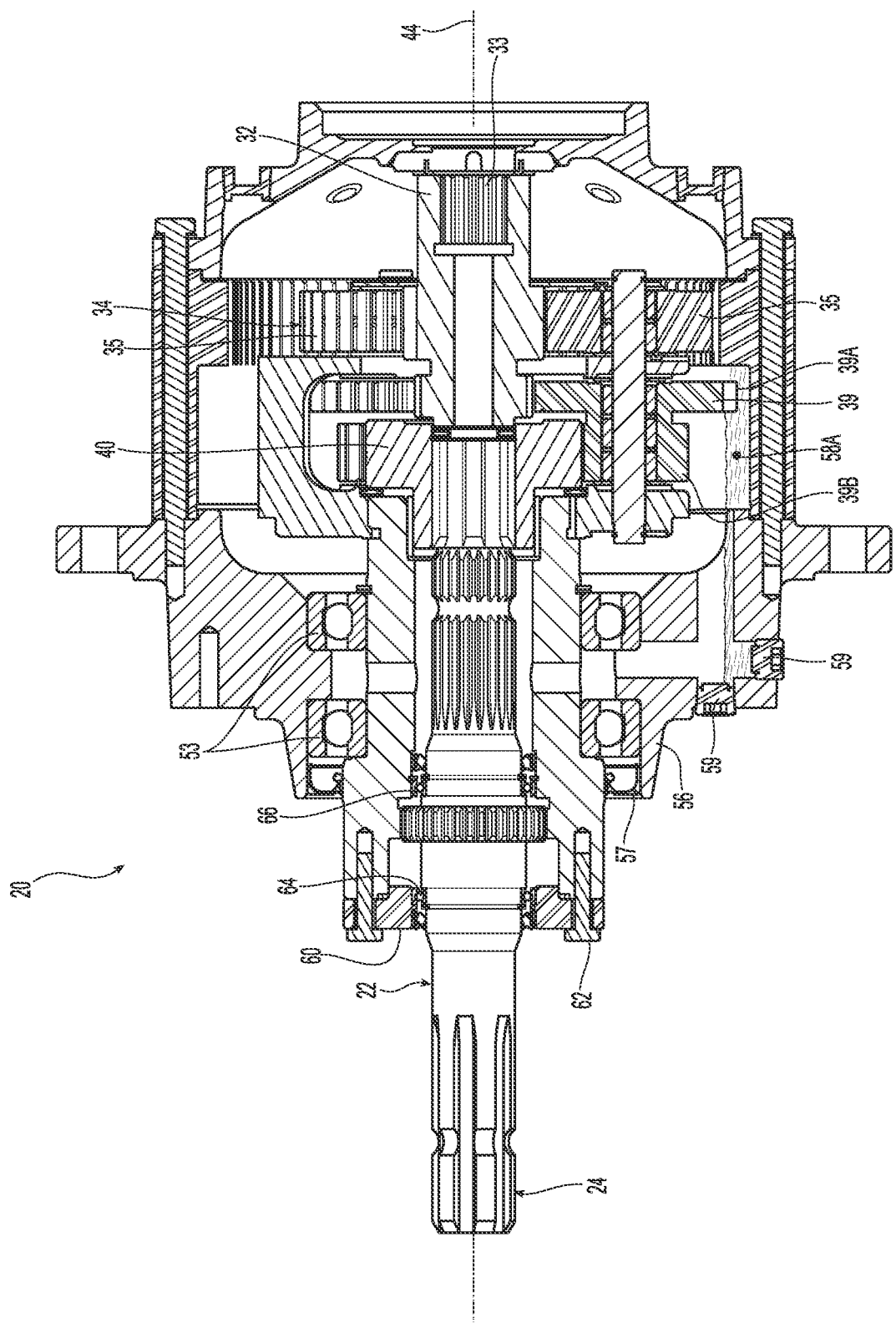
FIG. 3 is a cross sectional view of the exemplary gear assembly with the first end of the PTO shaft extending outwardly.

During operation, bearings 53 provide rotational support for output shaft 42. Bearings 53 are supported on gearbox housing 56 of planetary gear assembly 20. In the exemplary embodiment, housing 56 defines an interior volume 58 in which input sun gear 32 and output shaft 42 are at least partially disposed within interior 58 of housing 56 and planetary gears 35, ring gear 46, planet carrier 36, planetary gears 39, output sun gear 40 and bearings 53 are located within interior volume 58. An oil bath of gearbox oil is provided within housing interior 58 to lubricate these components. Oil seals 57 and threaded plugs 59 prevent leakage of the gearbox oil 58A from housing interior 58. As schematically depicted in FIG. 3, the gearbox oil will form a pool in the bottom of the housing interior which, due to contact with rotating gears would be splashed on the other components within interior of the gearbox housing. The use of such oil baths to lubricate a planetary gearbox is well-known to those having ordinary skill in the art. Alternative forms of circulating a lubricating and/or cooling oil within gearbox housing 56 may also be employed with the planetary gear assembly disclosed herein.

A removable cover plate 60 is attached to the outer end 61 of output shaft 42 during operation of assembly 20. In the illustrated embodiment, bolts 62 are used to removably attach cover plate 60, however, alternative methods of attachment may also be used.

Bearing assemblies are also used to support PTO shaft 22. In the illustrated embodiment, a first bearing assembly 64 is disposed between intermediate splines 54 and first end 24 of PTO shaft 22 and a second bearing assembly 66 is disposed between intermediate splines 54 and second end 26 of PTO shaft 22.

Intermediate splines 54 are closer to second bearing assembly 66 than to first bearing assembly 64. This off-midpoint location between bearing assemblies 64, 66 of splines 54, similar to the off-midpoint location of splines 54 between first and second ends 24, 26, facilitates the engagement of splines 54 with splines 52 in one orientation and the non-engagement of splines 54 and splines 52 in the opposite orientation of PTO shaft 22.

First and second bearing assemblies 64, 66 provide support for PTO shaft 22. In this regard, it is noted that when PTO shaft 22 is drivingly coupled with output shaft 42, there will be no relative rotation at the location of these bearings, however, bearings 64, 66 will still provide lateral support to PTO shaft 22 even though there will not be any relative rotation at the location of bearings 64, 66. When PTO shaft 22 is drivingly coupled with output sun gear 40, PTO shaft 22 will be rotated at a different rotational speed than the rotational speed of output shaft 42 and attached cover plate 60. Bearings 64, 66 will provide rotational support for PTO shaft 22 to enable the resulting relative rotation between PTO shaft 22 and output shaft 42 and attached cover plate 60.

When cover plate 60 is attached and second end 26 of PTO shaft 22 is inserted into longitudinally extending passage 43, cover plate 60 is engageable with first bearing assembly 64 and second bearing assembly 66 is engageable with a circumferentially extending surface 43A within longitudinally extending passage 43. When cover plate 60 is attached and first end 24 of PTO shaft 22 is inserted into longitudinally extending passage 43, cover plate 60 is engageable with second bearing assembly 66 and first bearing assembly 64 is engageable with circumferentially extending surface 43A within longitudinally extending passage 43.

Oil seals 68A, 68B are engageable with PTO shaft 22 and are used to prevent gearbox oil escaping from gearbox housing 56 through passage 43. A first oil seal 68A is mounted on cover plate 60 and a second oil seal 68B is mounted in longitudinally extending passage 43. When cover plate 60 is attached to output shaft 42, first oil seal 68A and second oil seal 68B define an outer region 70 in longitudinally extending passage 43 between first oil seal 68A and second oil seal 68B. Oil seals 68A, 68B thereby inhibit the escape of gearbox oil from the gearbox housing into outer region 70 and out of output shaft 42. Internal splines 52 are disposed in outer region 70.

Due to oil seals 68A, 68B, out outer region 70 is an essentially oil-free zone in the exemplary embodiment and first bearing assembly 64 and second bearing assembly 66 are sealed ball bearing assemblies which are both disposed in outer region 70 when PTO shaft 22 is drivingly engaged. Various alternative embodiments may also be employed. For example the size of the oil-free zone could be enlarged to include bearings 53 with bearings 53 being sealed ball bearing assemblies. Alternatively, the oil-bath zone could be expanded to include outer region 70 and non-sealed bearings used for bearings 64, 66. However, because bearings 64, 66 are mounted on PTO shaft 22 and exposed to the exterior environment when reversing the position of PTO shaft 22, the use of sealed bearings disposed in an oil-free space for bearings 64, 66 provides an advantageous arrangement.

The process for engaging and reversing PTO shaft 22 will now be discussed. FIGS. 1 and 3 shows planetary gear assembly 20 with PTO shaft 22 installed in an orientation where first end 24 is projecting outwardly whereby splines 28 can be engaged with an implement or other piece of equipment. In this position, PTO shaft 22 is drivingly engaged with planet carrier 36 via output shaft 42 and, in the exemplary embodiment, will be rotated at a nominal speed of 540 rpm.

Figure 2:
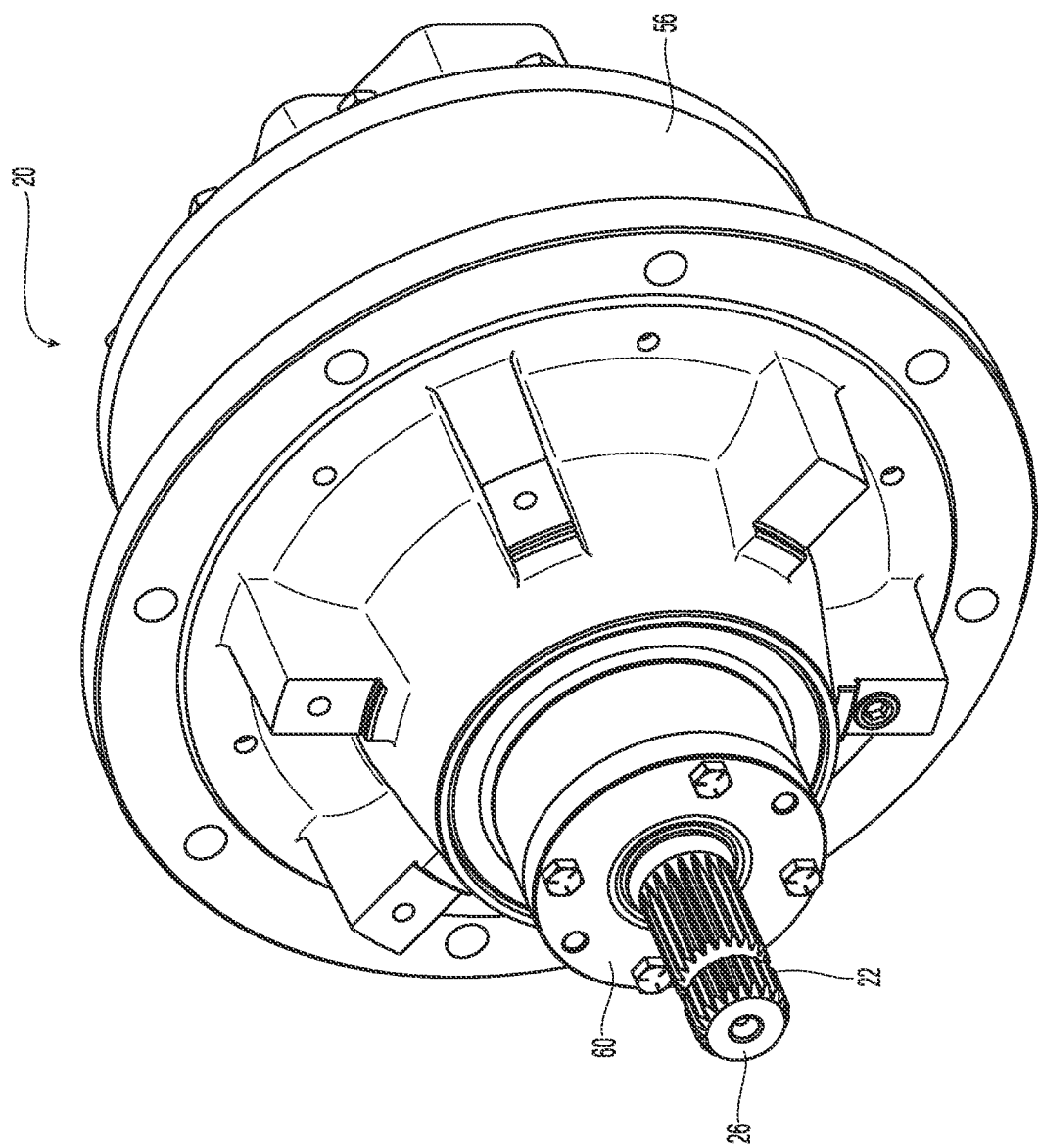
FIG. 2 is a perspective view of the exemplary planetary gear assembly with a second end of the PTO shaft extending outwardly.
Figure 4:
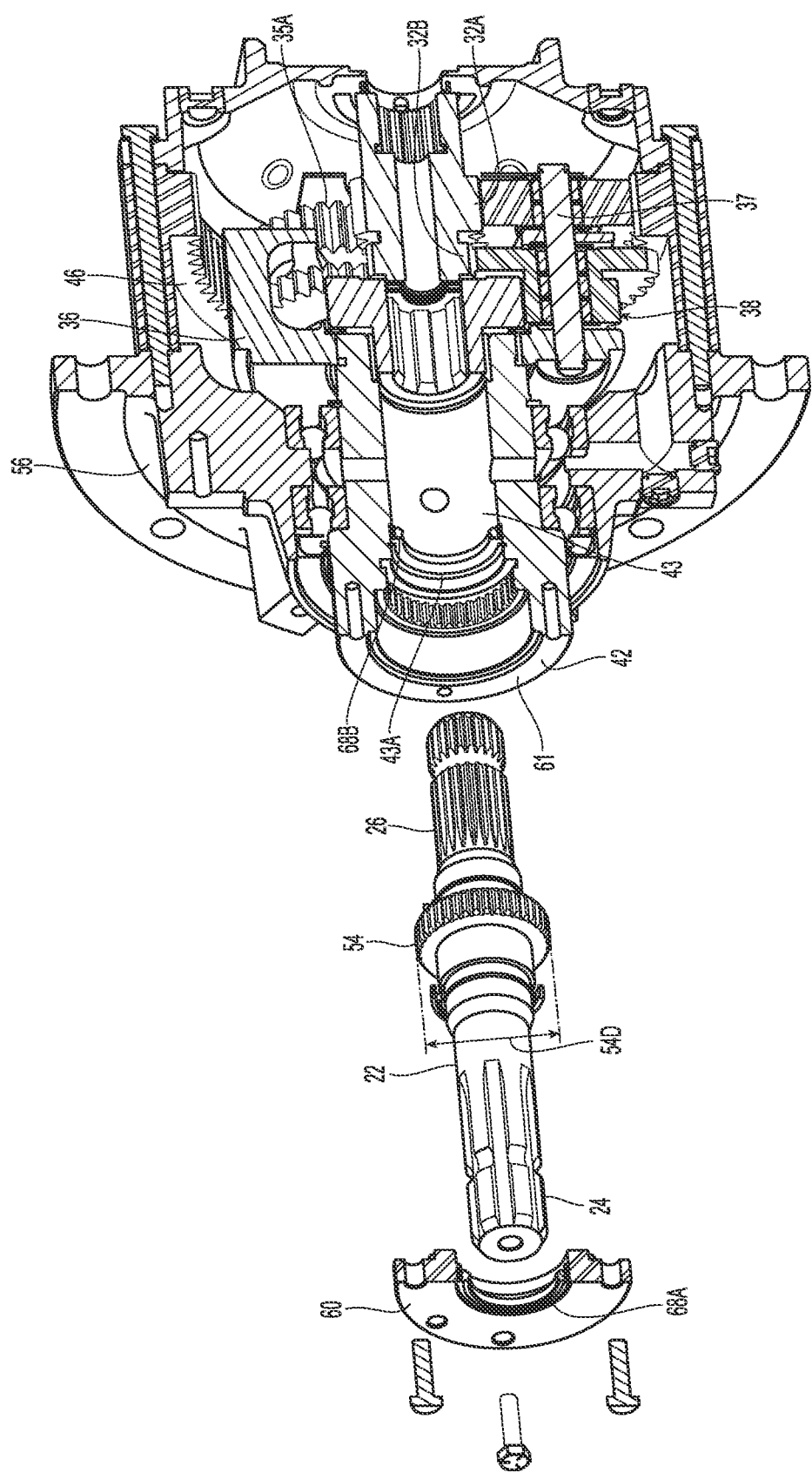
FIG. 4 is a cross sectional perspective view of the exemplary gear assembly with the cover plate detached and PTO shaft removed from the gear assembly.
Figure 5:
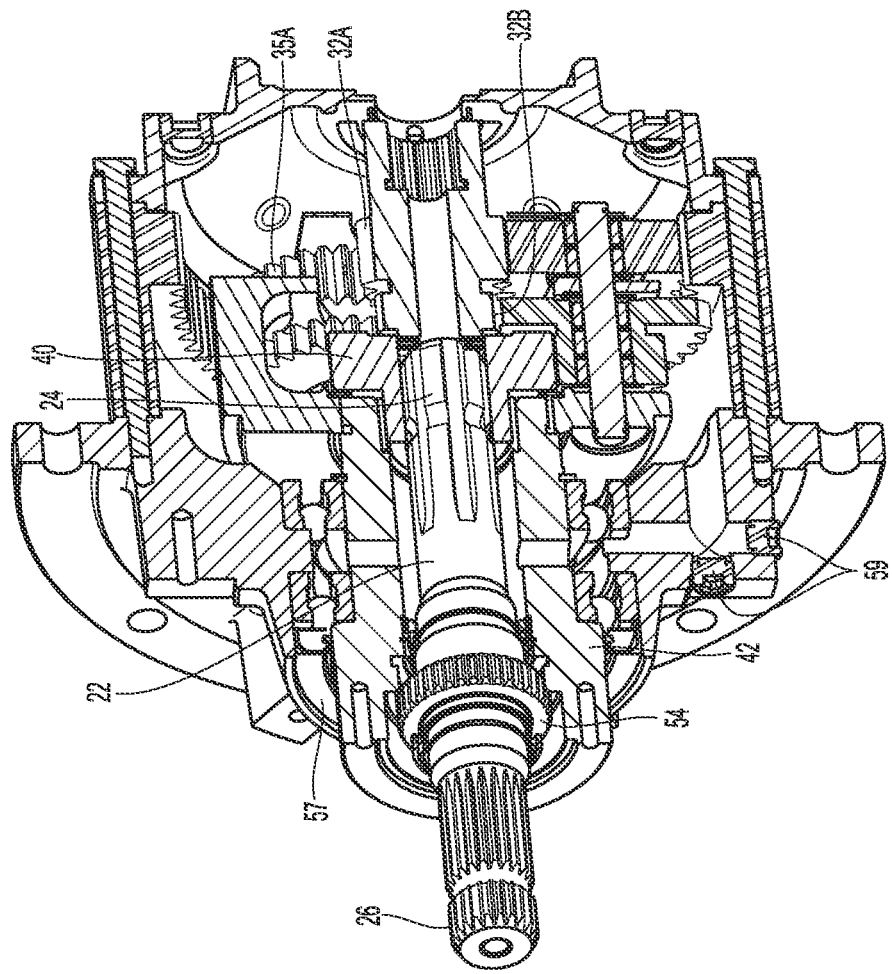
FIG. 5 is a cross sectional perspective view of the exemplary gear assembly with the PTO shaft being reinserted into the gear assembly after reversing the orientation of the PTO shaft relative to FIG. 4.
Figure 6:
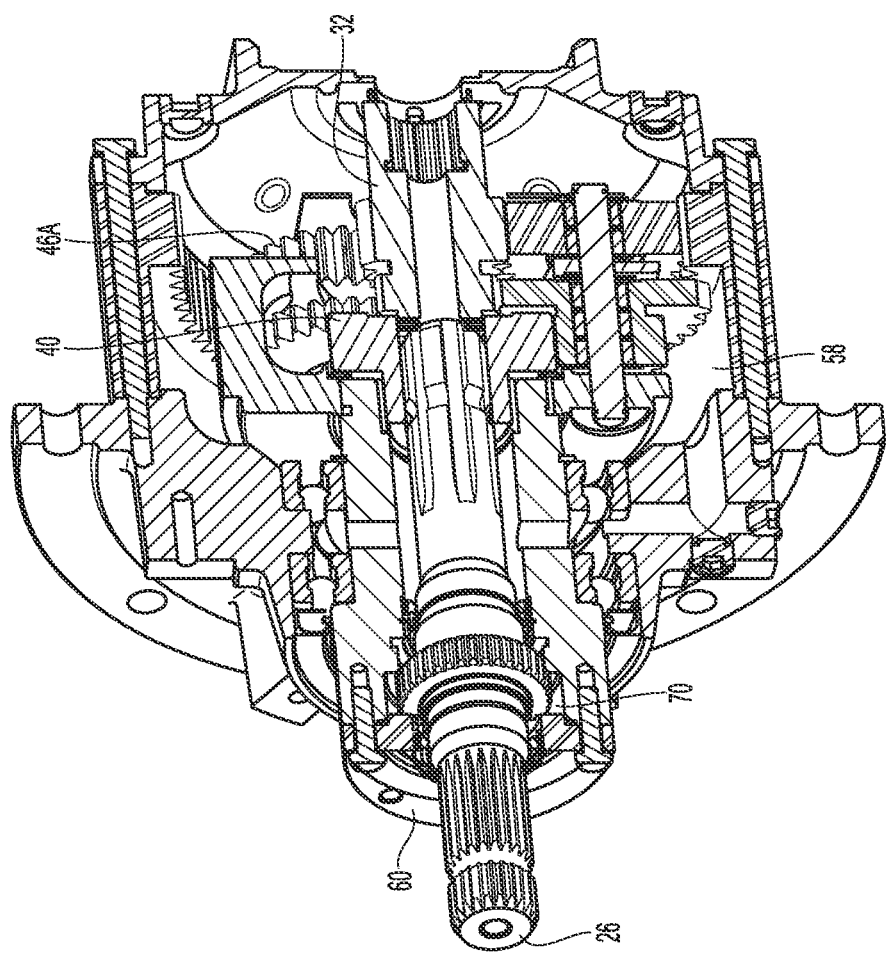
FIG. 6 is a cross sectional perspective view of the exemplary gear assembly in the same orientation as FIG. 5 after the cover plate has been reattached.
Figure 7:
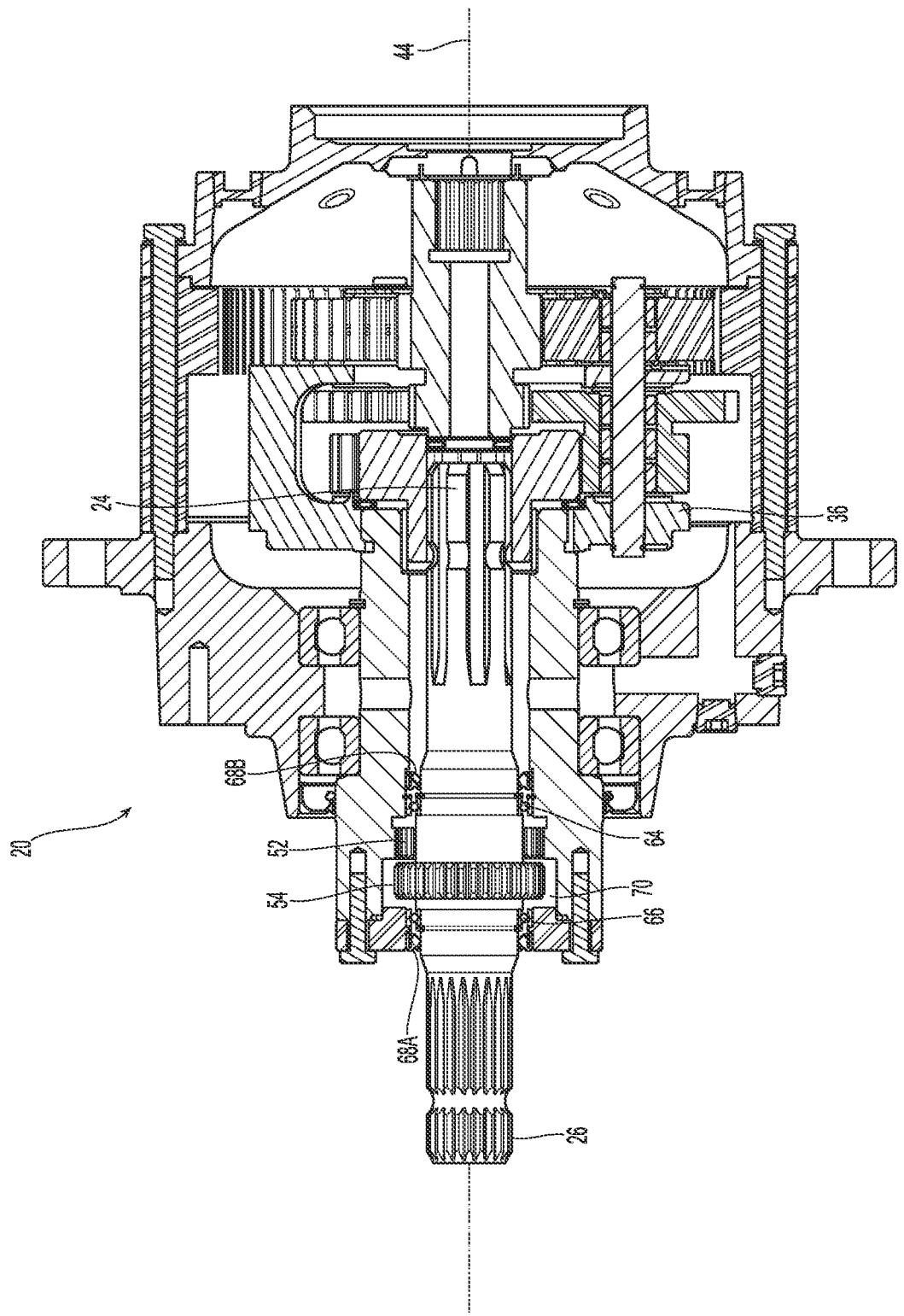
FIG. 7 is a cross sectional view of the exemplary gear assembly with the second end of the PTO shaft extending outwardly.
Figure 8:
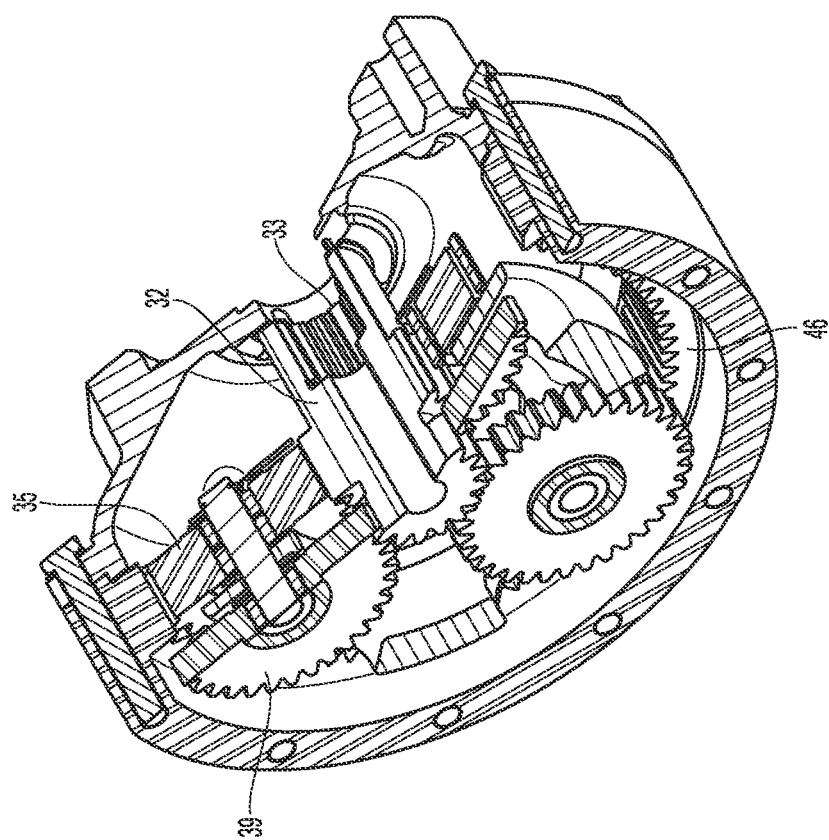
FIG. 8 is a partial cutaway view of the exemplary gear assembly showing the input sun gear.
Figure 9:
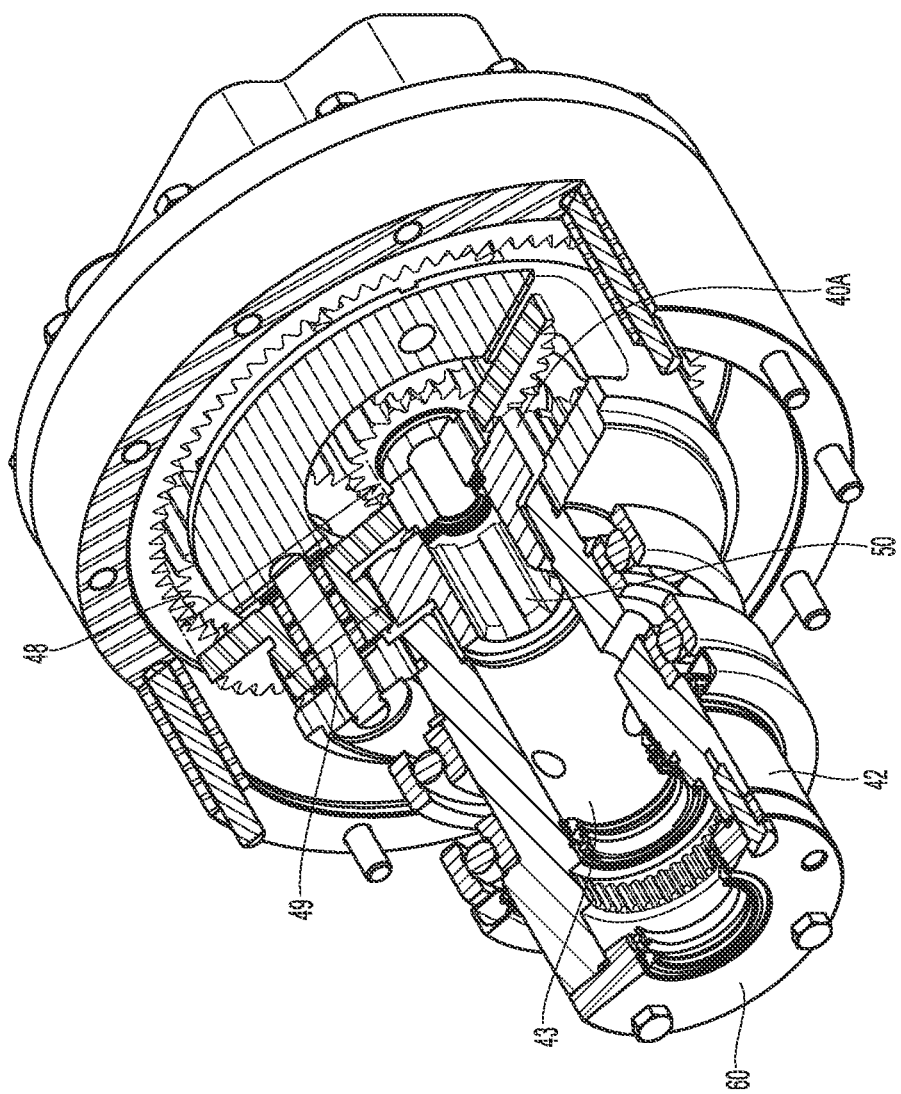
FIG. 9 is a partial cutaway view of the exemplary gear assembly showing the output sun gear and the output shaft.

To reverse the orientation, and change the rotational speed, of PTO shaft 22, cover plate 60 is removed by unthreading bolts 62. PTO shaft 22 is then pulled out of passage 43 as depicted in FIG. 4. The orientation of PTO shaft 22 is then reversed and first end 24 is inserted into passage 43 and engaged with output sun gear 40 as shown in FIG. 5. Cover plate 60 is then reattached using bolts 62 as shown in FIGS. 2, 6 and 7 with second end 26 projection outwardly. In this position, splines 30 can be engaged with an implement or other piece of equipment and PTO shaft 22 is drivingly engaged with output sun gear 40 and, in the exemplary embodiment, will be rotated at a nominal speed of 1000 rpm.

To return the PTO shaft 22 to the orientation shown in FIGS. 1 and 3, cover plate 60 is removed, PTO shaft 22 is pulled out of passage 43, its orientation is reversed, second end 26 is inserted back into passage 43 and cover plate 60 reattached.

While this invention has been described as having an exemplary design, the present invention may be further modified within the spirit and scope of this disclosure. This application is therefore intended to cover any variations, uses, or adaptations of the invention using its general principles.

What is claimed is:

1. A planetary gear assembly comprising:
   an input sun gear;
   at least one planetary gearset having a first plurality of planetary gears driven by the input sun gear;
   a planet carrier drivingly coupled with the first plurality of planetary gears;
   an output sun gear drivingly coupled with the planetary gear assembly wherein rotation of the input sun gear drivingly rotates the planet carrier at a first rotational speed and the output sun gear at a second rotational speed that differs from the first rotational speed;
   an output shaft rotationally fixed to the planet carrier wherein the output shaft and the output sun gear are simultaneously rotated about a common longitudinal axis at different speeds by rotation of the input sun gear, a longitudinally extending central passage extending through the output shaft wherein the output sun gear is accessible through the longitudinally extending central passage; and
   a PTO shaft having a first end and an opposite second end, the first end having a first set of splines defining a first spline arrangement and the second end having a second set of splines defining a second spline arrangement different than the first spline arrangement, wherein the PTO shaft is drivingly couplable with the planet carrier by inserting the second end of the PTO shaft into the longitudinally extending passage whereby the PTO shaft is rotatable at the first rotational speed with the first end of the PTO shaft projecting outwardly from the planetary gear assembly; and wherein the PTO shaft is drivingly couplable with the output sun gear by inserting the first end of the PTO shaft into longitudinally extending passage whereby the PTO shaft is rotatable at the second rotational speed with the second end of the PTO shaft projecting outwardly from the planetary gear assembly.

2. The planetary gear assembly of claim 1 wherein the first spline arrangement is a 6 tooth arrangement and the second spline arrangement is a 21 tooth arrangement and, when the input sun gear is rotated at a preselected rotational speed, the planet carrier is rotated at a nominal rotational speed of 540 rpm and the output sun gear is rotated at a nominal rotational speed of 1000 rpm.

3. The planetary gear assembly of claim 1 wherein the at least one planetary gearset further comprises a second planetary gearset comprising a second plurality of planetary gears; and wherein the second plurality of planetary gears is drivingly coupled with the output sun gear.

4. The planetary gear assembly of claim 3 wherein each of the second plurality of planetary gears has a first set of gear teeth drivingly coupled with the input sun gear and a second set of gear teeth drivingly coupled with the output sun gear.

5. The planetary gear assembly of claim 3 wherein each of the second plurality of planetary gears is coupled with the planet carrier.

6. The planetary gear assembly of claim 5 wherein each one of the second plurality of planetary gears is coupled with one of the first plurality of planetary gears by a pin extending through the planet carrier.

7. The planetary gear assembly of claim 5 wherein each of the second plurality of planetary gears has a first set of gear teeth defining a first diameter and drivingly coupled with the input sun gear and a second set of gear teeth defining a second diameter and drivingly coupled with the output sun gear, the first and second diameters being different whereby, during operation of the planetary gear assembly, the input sun gear and the output sun gear rotate at different rotational speeds.

8. The planetary gear assembly of claim 1 wherein:
the output shaft has an internal set of splines disposed within the longitudinally extending passage;
the PTO shaft has an intermediate set of splines defining a maximum diameter of the PTO shaft, the intermediate set of splines being positioned closer to the second end of the PTO shaft than the first end of the PTO shaft, the intermediate set of splines being engageable with the internal set of splines of the output shaft to thereby drivingly couple the PTO shaft with the planet carrier when the second end of the PTO shaft is inserted into the longitudinally extending passage; and
the output sun gear has a splined recess engageable with the first set of splines of the PTO shaft to thereby drivingly couple with the PTO shaft with the output sun gear when the first end of the PTO shaft is inserted into the longitudinally extending passage.

9. The planetary gear assembly of claim 8 further comprising:
a first bearing assembly disposed between the intermediate set of splines and the first end of the PTO shaft; and
a second bearing assembly disposed on the PTO shaft between the intermediate splines and the second end of the PTO shaft and wherein the intermediate set of splines is closer to second bearing assembly than the first bearing assembly.

10. The planetary gear assembly of claim 9 further comprising:
a removable cover plate attachable to an outer end of the output shaft wherein, when the cover plate is attached and the second end of the PTO shaft is inserted into the longitudinally extending passage, the cover plate is engageable with the first bearing assembly and the second bearing assembly is engageable with a circumferentially extending surface within the longitudinally extending passage; and
when the cover plate is attached and the first end of the PTO shaft is inserted into the longitudinally extending passage, the cover plate is engageable with the second bearing assembly and the first bearing assembly is engageable with the circumferentially extending surface within the longitudinally extending passage.

11. The planetary gear assembly of claim 10 wherein:
the planetary gear assembly includes a gearbox housing wherein the input sun gear and output shaft are at least partially disposed within the gearbox housing and the at least one planetary gearset, the planet carrier and the output sun gear are all disposed within the gearbox housing and wherein gearbox oil is contained within the gearbox housing; and
a first oil seal is mounted on the cover plate and a second oil seal is mounted in the longitudinally extending passage wherein, when the cover plate is attached to the output shaft, the first oil seal and the second oil seal define an outer region in the longitudinally extending passage between the first oil seal and the second oil seal and inhibit the escape of gearbox oil from the gearbox housing into the outer region and the internal set of splines are disposed in the outer region.

12. The planetary gear assembly of claim 11 wherein the first bearing assembly and the second bearing assembly are sealed ball bearing assemblies and, when the PTO shaft is drivingly engaged with the planetary gear assembly, the first bearing assembly and the second bearing assembly are both disposed in the outer region.

13. A planetary gear assembly comprising:
an input sun gear;
a first planetary gearset having a first plurality of planetary gears driven by the input sun gear;
a planet carrier drivingly coupled with the first plurality of planetary gears;
a second planetary gearset comprising a second plurality of planetary gears driven by the input sun gear;
an output sun gear drivingly coupled with the second plurality of planetary gears wherein rotation of the input sun gear drivingly rotates the planet carrier at a first rotational speed and the output sun gear at a second rotational speed that differs from the first rotational speed;
an output shaft rotationally fixed to the planet carrier wherein the output shaft and the output sun gear are simultaneously rotated about a common longitudinal axis at different speeds by rotation of the input sun gear, a longitudinally extending central passage extending through the output shaft wherein the output sun gear is accessible through the longitudinally extending central passage and wherein the output shaft has an internal set of splines disposed within the longitudinally extending passage;
a PTO shaft having a first end and an opposite second end, the first end having a first set of splines defining a first spline arrangement and the second end having a second set of splines defining a second spline arrangement different than the first spline arrangement, wherein the PTO shaft is drivingly couplable with the planet carrier by inserting the second end of the PTO shaft into the longitudinally extending passage whereby the PTO shaft is rotatable at the first rotational speed with the first end of the PTO shaft projecting outwardly from the planetary gear assembly; and wherein the PTO shaft is drivingly couplable with the output sun gear by inserting the first end of the PTO shaft into longitudinally extending passage whereby the PTO shaft is rotatable at the second rotational speed with the second end of the PTO shaft projecting outwardly from the planetary gear assembly;
wherein the PTO shaft has an intermediate set of splines defining a maximum diameter of the PTO shaft, the intermediate set of splines being positioned closer to the second end of the PTO shaft than the first end of the PTO shaft, the intermediate set of splines being engageable with the internal set of splines of the output shaft to thereby drivingly couple the PTO shaft with the planet carrier when the second end of the PTO shaft is inserted into the longitudinally extending passage; and the output sun gear has a splined recess engageable with the first set of splines of the PTO shaft to thereby drivingly couple with the PTO shaft with the output sun gear when the first end of the PTO shaft is inserted into the longitudinally extending passage.

14. The planetary gear assembly of claim 13 wherein each of the second plurality of planetary gears has a first set of gear teeth defining a first diameter and drivingly coupled with the input sun gear and a second set of gear teeth defining a second diameter and drivingly coupled with the output sun gear, the first and second diameters being different whereby, during operation of the planetary gear assembly, the input sun gear and the output sun gear rotate at different rotational speeds.

15. The planetary gear assembly of claim 14 wherein each of the second plurality of planetary gears is coupled with the planet carrier.

16. The planetary gear assembly of claim 15 wherein each one of the second plurality of planetary gears is coupled with one of the first plurality of planetary gears by a pin extending through the planet carrier.

17. The planetary gear assembly of claim 15, further comprising:

a first bearing assembly disposed between the intermediate set of splines and the first end of the PTO shaft;

a second bearing assembly disposed between the intermediate splines and the second end of the PTO shaft and wherein the intermediate set of splines is closer to second bearing assembly than the first bearing assembly;

a removable cover plate attachable to an outer end of the output shaft wherein, when the cover plate is attached and the second end of the PTO shaft is inserted into the longitudinally extending passage, the cover plate is engageable with the first bearing assembly and the second bearing assembly is engageable with a circumferentially extending surface within the longitudinally extending passage; and when the cover plate is attached and the first end of the PTO shaft is inserted into the longitudinally extending passage, the cover plate is engageable with the second bearing assembly and the first bearing assembly is engageable with the circumferentially extending surface within the longitudinally extending passage.

18. The planetary gear assembly of claim 17 wherein:

the planetary gear assembly includes a gearbox housing wherein the input sun gear and output shaft are at least partially disposed within the gearbox housing and the first and second planetary gearsets, the planet carrier and the output sun gear are all disposed within the gearbox housing and wherein gearbox oil is contained within the gearbox housing;

a first oil seal is mounted on the cover plate and a second oil seal is mounted in longitudinally extending passage wherein, when the cover plate is attached, the first oil seal and the second oil seal define an outer region in the longitudinally extending passage between the first oil seal and the second oil seal and inhibit the escape of gearbox oil from the gearbox housing into the outer region and the internal set of splines are disposed in the outer region; and wherein the first bearing assembly and the second bearing assembly are sealed ball bearing assemblies and, when the PTO shaft is drivingly engaged with the planetary gear assembly, the first bearing assembly and the second bearing assembly are both disposed in the outer region.

19. The planetary gear assembly of claim 18 wherein the first spline arrangement is a 6 tooth arrangement and the second spline arrangement is a 21 tooth arrangement and, when the input sun gear is rotated at a preselected rotational speed, the planet carrier is rotated at a nominal rotational speed of 540 rpm and the output sun gear is rotated at a nominal rotational speed of 1000 rpm.

* * * * *

UNITED STATES PATENT AND TRADEMARK OFFICE
CERTIFICATE OF CORRECTION

| | |
|---|---|
| PATENT NO. | : 12,092,203 B1 |
| APPLICATION NO. | : 18/402913 |
| DATED | : September 17, 2024 |
| INVENTOR(S) | : James L. Forrest |

Page 1 of 1

It is certified that error appears in the above-identified patent and that said Letters Patent is hereby corrected as shown below:

In the Specification

Column 4, Line 1, "couple with the" should be --couple the--.

Column 9, Line 39, "68B, out outer region 70" should be --68B, outer region 70--.

In the Claims

Column 10, Line 52, Claim 1, "into longitudinally" should be --into the longitudinally--.

Column 11, Line 38, Claim 8, "couple with the PTO shaft" should be --couple the PTO shaft--.

Column 13, Line 9, Claim 13, "couple with the PTO shaft" should be --couple the PTO shaft--.

Column 14, Line 19, Claim 18, "in longitudinally" should be --in the longitudinally--.

Signed and Sealed this
Twenty-second Day of October, 2024

Katherine Kelly Vidal
*Director of the United States Patent and Trademark Office*